(12) United States Patent
Doyle (10) Patent No.: US 11,287,547 B2
(45) Date of Patent: Mar. 29, 2022

(54) METHOD AND APPARATUS FOR DYNAMIC DOSE ESTIMATION AND IONIZING RADIATION SOURCE ADJUSTMENT

(71) Applicant: SMITHS DETECTION GERMANY GMBH, Wiesbaden (DE)

(72) Inventor: Rory Doyle, Wiesbaden (DE)

(73) Assignee: Smiths Detection Germany GmbH, Wiesbaden (DE)

( * ) Notice: Subject to any disclaimer, the term of this patent is extended or adjusted under 35 U.S.C. 154(b) by 0 days.

(21) Appl. No.: 16/463,001

(22) PCT Filed: Nov. 21, 2017

(86) PCT No.: PCT/GB2017/053488
§ 371 (c)(1),
(2) Date: May 22, 2019

(87) PCT Pub. No.: WO2018/096324
PCT Pub. Date: May 31, 2018

(65) Prior Publication Data
US 2019/0285768 A1    Sep. 19, 2019

(30) Foreign Application Priority Data
Nov. 22, 2016 (GB) ..................... 1619718

(51) Int. Cl.
*G01V 5/00* (2006.01)
*G01N 23/04* (2018.01)
*G01T 1/167* (2006.01)

(52) U.S. Cl.
CPC ........... *G01V 5/0033* (2013.01); *G01N 23/04* (2013.01); *G01T 1/167* (2013.01); *G01N 2223/3032* (2013.01)

(58) Field of Classification Search
CPC ...... G01V 5/00; G01V 5/0033; G01V 5/0016; G01N 23/04; G01N 23/02; G01N 23/06;
(Continued)

(56) References Cited

U.S. PATENT DOCUMENTS 7,116,756 B2 * 10/2006 Klingenbeck-Regn ...................... A61B 5/1072 378/95
7,894,570 B2 * 2/2011 Evron .................... A61B 6/544 378/8

(Continued)

FOREIGN PATENT DOCUMENTS

CN  203299146 U  11/2013
CN  105717548 A  6/2016

OTHER PUBLICATIONS

PCT International Preliminary Report on Patentability and Written Opinion for PCT/GB2017/053488, dated May 28, 2019.

(Continued)

*Primary Examiner* — Jurie Yun
(74) *Attorney, Agent, or Firm* — Kevin E. West (57) ABSTRACT

In one embodiment, there is provided a system for inspection of a human or animal body, comprising: a radiation provider configured to provide ionizing radiation having a radiation dose to the body, for inspection of the body by transmission; a measurement device configured to measure other than the ionizing radiation to determine at least one property associated with a dimension of the body to inspect; and a controller configured to cause the radiation dose provided to the body by the radiation provider to be controlled based on the at least one property determined by the measurement device.

18 Claims, 4 Drawing Sheets

(58) Field of Classification Search
CPC .......... G01N 23/083; G01N 2223/3032; A61B 6/06; A61B 6/54; A61B 6/542; A61B 6/545; A61B 6/58; A61B 6/4035
USPC ...... 378/51, 63, 95, 145, 150, 151, 156, 159
See application file for complete search history.

(56) References Cited

U.S. PATENT DOCUMENTS

| | | |
|---|---|---|
| 8,971,486 B2* | 3/2015 | Scholling ......... G01N 23/20083 378/57 |
| 2005/0031082 A1* | 2/2005 | Haaga ..................... A61B 6/00 378/108 |
| 2007/0172102 A1 | 7/2007 | Hempel |
| 2013/0188772 A1* | 7/2013 | Geus .................... G01V 5/0016 378/51 |
| 2014/0339430 A1 | 11/2014 | Hillis |
| 2015/0177391 A1 | 6/2015 | Cox |

OTHER PUBLICATIONS

PCT International Search Report and Written Opinion for PCT/GB2017/053488, dated Mar. 9, 2018.

* cited by examiner

Figure 6A

METHOD AND APPARATUS FOR DYNAMIC DOSE ESTIMATION AND IONIZING RADIATION SOURCE ADJUSTMENT

FIELD OF INVENTION

The present disclosure relates to scanning apparatus and methods and to the detection of objects concealed by a living human or animal body, for example by imaging.

BACKGROUND

In correctional facilities and at national borders, there is a need to detect contraband such as weapons, narcotics, mobile telephones, and other objects. Objects may be concealed internally or externally, for example in clothing, in body cavities such as the mouth or anal canal, hidden in prosthetics such as artificial limbs, they may also be swallowed or even surgically implanted.

Detection of such contraband is necessary for law enforcement, and to maintain order in correctional facilities, and to control the transit of contraband across national borders. It has been proposed to use imaging techniques based on ionizing radiation, such as transmission X-ray, to identify contraband hidden in the human or animal body.

The ionising radiation has a radiation dose, which can be associated with a measure representative of the amount of ionizing radiation absorbed by an individual. Strict regulations limit the dose to which human subjects may be exposed.

Aspects of the present invention address some of the above issues.

SUMMARY OF INVENTION

Aspects and embodiments of the present disclosure, such as those set out in the appended claims, aim to address the above mentioned technical problem, and related technical problems.

BRIEF DESCRIPTION OF DRAWINGS

Embodiments of the disclosure will now be described, by way of example only, with reference to the accompanying drawings, in which.

In the drawings, like elements are referred to by the same numerical references.

DESCRIPTION OF EXAMPLE EMBODIMENTS

Overview

Figures 1, 5:
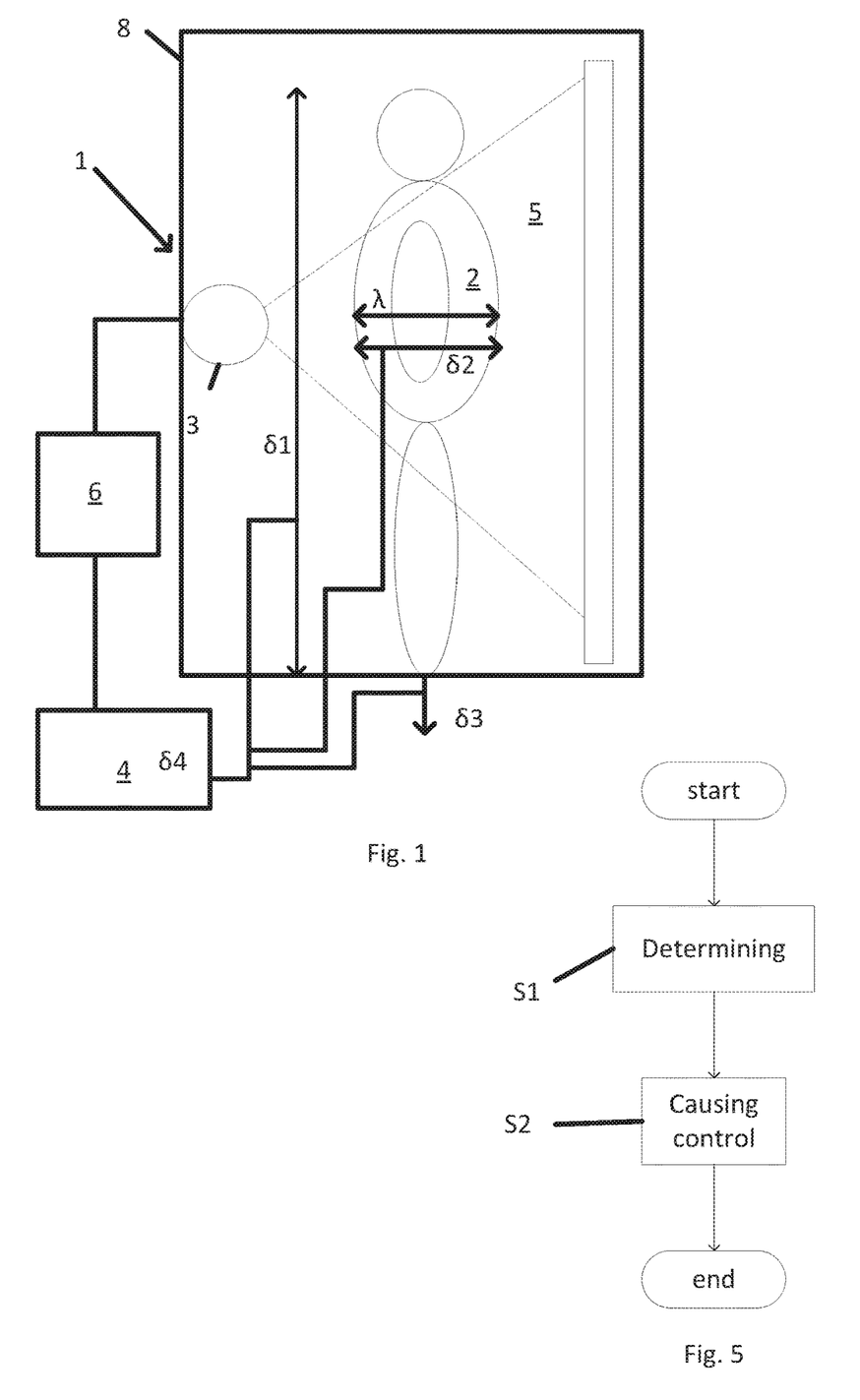
FIG. 1 shows an example system, viewed from a side.
FIG. 5 shows a flowchart that illustrates an example method for irradiating a body.

FIG. 1 shows a schematic illustration of a system 1 for irradiation of a human or animal body 2. The system 1 illustrated in FIG. 1 comprises a radiation provider 3 and a measurement device 4.

The radiation provider 3 may be configured to provide ionizing radiation 5 having a radiation dose to the body 2, for example for inspection of the body, for example by transmission. In some examples and as explained in greater detail below, the provider 3 may provide a radiation beam over a substantially two-dimensional cross-section through which the body 2 passes. The ionizing radiation 5 can be shaped using a collimator described in more detail below. In some examples, the radiation provider 3 may be arranged to provide the ionizing radiation to at least a torso of the body 2, such as a human subject.

The measurement device 4 illustrated in FIG. 1 may be configured to determine at least one property $\delta$ associated with a dimension $\lambda$ of the body to inspect, using other than the ionizing radiation. For example, the measurement device may be configured to measure (e.g. sense) other that the ionizing radiation 5 to determine the at least one property $\delta$ associated with the dimension $\lambda$ of the body 2 to inspect. As explained in greater detail below, the measurement device 4 may be configured to measure a physical quantity other that the ionizing radiation 5.

The dimension $\lambda$ may be the maximum width $\lambda$ of the body 2 through which the ionizing radiation 5 may be transmitted. Depending on the body 2, the dimension $\lambda$ may correspond to the width of a torso or waistline of a human subject 2.

In examples where the system 1 comprises a support structure 8 adapted to hold the radiation provider 3 in position for inspection the body 2 (such as e.g. an upright human subject), the property $\delta$ associated with the dimension $\lambda$ of the body 2 to inspect may comprise the height and/or the width of the body 2 (e.g. such as a height $\delta 1$ of the human subject 2 and/or such as a width $\delta 2$ of the subject 2) and/or the weight (such as a weight $\delta 3$ of the subject 2 in FIG. 1) of the body 2 and/or the body mass index (BMI) of the body 2 (such as a BMI $\delta 4$ of the subject 2 in FIG. 1).

In some examples, the structure 8 may define an imaging region, which may be demarcated by a portal, sized to allow passage of an upright human adult. The structure 8 can be of any suitable shape, including for example, rectangular, square, circular, oval, or U-shaped. It is contemplated that the structure 8 can be configured to accommodate bodies 2 of varying heights, weights, and physical ability.

The system 1 illustrated in FIG. 1 further comprises a controller 6 configured to cause the radiation dose provided to the body 2 by the radiation provider 3 to be controlled, based on the at least one property $\delta$ determined by the measurement device 4.

Embodiments of the disclosure may therefore provide better quality inspection of human or animal body, for one or more of the reasons stated below.

In embodiments of the disclosure, scanning of the human or animal body, using e.g. transmission X-ray, may be obtained with variable radiation dose, depending on the human or animal body.

The ionizing radiation is absorbed or attenuated by the body (or a portion of the body). Different density tissues and materials absorb or attenuate the ionizing radiation differently. Bone, for example, is a relatively dense material within the body and can attenuate a large quantity of the ionizing radiation, which may impact on a quality of an image of the bone. In contrast, soft tissue is relatively less dense within the body and can attenuate a lesser quantity of the ionizing radiation.

It should be understood that a bigger body 2 with a greater dimension λ (such as a maximum thickness) through which the ionizing radiation needs to be transmitted will absorb or attenuate more the ionizing radiation compared to a smaller body 2 with a smaller dimension λ.

The system according to the disclosure enables adjustment of the radiation dose, depending on the human or animal body. The system according to the disclosure enables using an optimal radiation dose depending on the human or animal body. The system according to the disclosure enables optimal image quality. The system according to the disclosure may thus avoid obtaining a non-optimal image quality.

In embodiments of the disclosure, an operator of the system according to the disclosure does not need to manually choose a radiation dose. The system according to the disclosure may avoid using somewhat arbitrary, non-optimal, excessive or insufficient, radiation dose. The system according to the disclosure may avoid using a potentially higher dose than is necessary, and potentially higher dose may be harmful to the health of the human or animal body.

The system according to the disclosure enables using optimal dose, depending on the human or animal body, to optimise an image of a torso (e.g. an abdominal region) of the human or animal body. The system according to the disclosure may ensure that the minimum necessary dose for obtaining an optimal image quality is applied to the human or animal body.

In some examples of the disclosure, the determination of the optimal dose may be performed before exposure of the human or animal body to the ionizing radiation. In some examples of the disclosure, the human or animal body may thus only be exposed to the optimal dose determined before exposure to the ionizing radiation.

The system according to the disclosure may ensure consistent performance of the system, by ensuring the image quality is consistent as a function of a variability of dimensions of inspected human or animal bodies.

Advantages of the inspection system 1 as disclosed herein can include optimal and adjustable dose x-ray imaging.

Detailed Description of Example Embodiments

Figures 2A, 2B:
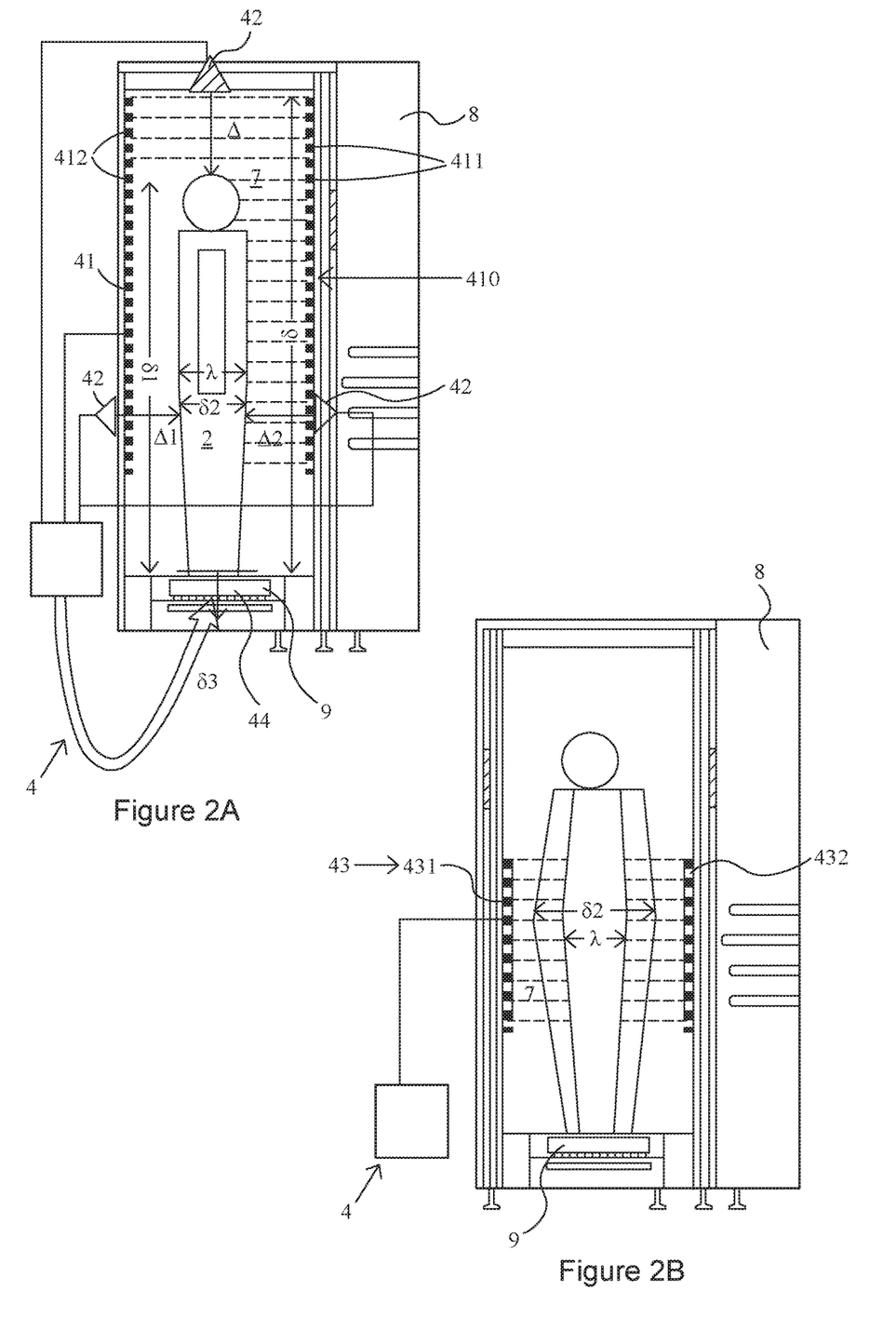
FIG. 2A shows an example measurement device, viewed from a side.
FIG. 2B shows another example measurement device, viewed from a side.

As illustrated by FIG. 2A and FIG. 2B, the measurement device 4 may be configured to sense at least one of non-ionizing radiation 7 and/or high frequency acoustic signals 7 such as ultrasounds. In some examples, the non-ionizing radiation 7 may comprise at least one of visible light (i.e. with a wavelength comprised between of 400 nanometres (nm) and 700 nanometres (nm)) and/or laser light, infrared light, terahertz, millimetre waves, and/or radio-waves.

In some examples and as illustrated in FIG. 2A, the measurement device 4 may comprise at least one curtain 41.

In some examples, the curtain 41 may comprise one or more pairs 410, each pair 410 comprising a transmitter 411 of the non-ionizing radiation 7 and a receiver 412 of the non-ionizing radiation 7. The curtain 41 may extend along a direction parallel to the direction of the property δ to be determined, e.g. such as the height δ1 of the human subject 2 in FIG. 1 and FIG. 2A. In some examples, each of the transmitters 411 may emit a beam of the non-ionizing radiation 7 to a corresponding receiver 412. Each of the receivers 412 may comprise a detector of the non-ionizing radiation 7, such as photoelectric cells as non-limiting examples. The curtain 41 thus emits an array of parallel beams of the non-ionizing radiation 7 along the direction parallel to the direction of the property δ. When the body 2 breaks one or more of the beams, the measurement device 4 may determine the property δ, such as the height δ1 of the human subject 2 of FIG. 2A.

Alternatively or additionally, in some examples and as illustrated in FIG. 2A, the measurement device 4 may comprise at least one range finder 42.

In some examples, the range finder 42 may be configured to measure a distance Δ from the range finder 42 to the body 2, for example in a direction parallel to a direction of the property δ, e.g. such as the height δ1 of the human subject 2 in FIG. 1 and FIG. 2A. In some examples, the range finder 42 may be configured to emit non-ionizing radiation 7 and/or high frequency acoustic signals 7, and detect the non-ionizing radiation 7 and/or high frequency acoustic signals 7 as reflected by the body 2 (e.g. the top of the head of the human subject 2), using measurements of the travel time of the non-ionizing radiation 7 and/or high frequency acoustic signals 7. In the example of FIG. 2A, the measurement device 4 may determine the property δ, such as the height δ1 of a human subject 2 by deducting the distance Δ from the height of the structure 8 to which the range finder 42 is attached.

It should be understood, as explained in more detail below, that the height δ1 may be associated with the maximum width λ of the body 2 and may be used to control the radiation dose provided to the body 2 by the radiation provider 3.

In some examples, alternatively or additionally, the height measurement 61 may be used separately to adjust and/or scale the image data in order to present a standardised presentation to the system operator.

In the example of FIG. 2A, the range finder 42 described above may be used to determine the property δ, such as the height δ1 of a human subject 2. Alternatively or additionally, the measurement device 4 may comprise one or more ranger finders 42 arranged along an upright direction of the body to determine e.g. a width δ2 of the body 2. In the example of FIG. 2A, the measurement device 4 comprises at least one range finder 42 arranged to the front of the imaging region defined by the structure 8, for determining the distance Δ1 at the front of the subject's body 2, and at least one range finder 42 arranged to the rear of the imaging region for determining the distance Δ2 at the back of the subject's body 2. The width δ2 of the body 2 may be derived by the measurement device 4 from the distances Δ1 and Δ2. In the example of FIG. 2A, only one pair of range finders 42 is illustrated, but it should be understood that the range finders 42 may span the height of the subject's body 2, from the floor of the imaging region to at least the height of the subject's head.

Alternatively or additionally, in some examples and as illustrated in FIG. 2B, the measurement device 4 may comprise at least one scanner 43 adapted for scanning soft tissue surfaces of the body 2.

In some examples, the scanner 43 may be arranged to use the non-ionizing radiation 7 and/or the high frequency acoustic signals 7 to detect hidden objects concealed by a subject's clothing. It may also be operable to scan soft tissue surfaces, such as skin, hidden beneath the subject's clothing.

The scanner 43 of FIG. 2B includes a part 431 arranged to the front of the imaging region defined by the structure 8, for scanning the face and front of the subject's body 2, and a part 432 arranged to the rear of the imaging region for scanning the back of the subject's body 2. Each part 431 and 432 includes providers and detectors for radiation 7 and/or high frequency acoustic signals 7, for example transmit/receive antennae. The providers and detectors may be provided by transmitting and receiving antennae that are tuned to receive and transmit the radiation 7 and/or high frequency acoustic signals 7. The scanner 43 may comprise an elongate linear array of such transmitting and receiving antennae. In the example of FIG. 2B, the parts 431 and 432 are mainly located around a middle portion of the subject's body 2 (e.g. corresponding to a waist region of the subject's body 2). It should however be understood that the parts 431 and 432 may span the height of the subject's body, from the floor of the imaging region to at least the height of the subject's head.

In FIG. 2B each linear array is arranged in a straight vertical line. It can be seen in FIG. 2B that these arrays of the scanner 43 define an imaging plane. Relative movement of this imaging plane with respect to the subject 2 can enable the subject's body to be scanned with the radiation 7 and/or high frequency acoustic signals 7. Relative movement may be imparted by a conveyance apparatus 9 described in more detail below. The scanner 43 is thereby arranged so that scan data can be collected from most, for example all areas of the subject's body in the imaging region. This can enable first image data, showing these areas of the subject's body, to be reconstructed from the scan data.

The parts 431 and 432 of the scanner 43 are arranged to detect the radiation 7 and/or the high frequency acoustic signals 7 after it has interacted with, for example been reflected, by the subject's body 2. It will be appreciated in the context of the present disclosure that the spatial and/or temporal distribution of signal intensity of this scattered radiation 7 and/or high frequency acoustic signals 7 can be used to scan the subject's body 2. The scan data need not be reconstructed into an image in the conventional sense that a human operator might recognise—for example features of the scan data (for example signal intensity or Fourier domain features) may be used instead without the need to reconstruct a complete image. The scan data may of course however be used to assemble an image of the subject's body. Such images may be three dimensional. One way to achieve this is to use synthetic aperture reconstruction. Other image reconstruction techniques will be apparent to the skilled person in the context of the present disclosure.

The measurement device 4 may determine the property $\delta$, such as the width $\delta 2$ of a human subject 2 from the scan data and/or image described above.

Alternatively or additionally, the measurement device 4 may comprise a camera, such as a video camera to record the scan, or simply to capture a picture of the body 2 being scanned. The measurement device 4 may determine the property $\delta$, such as the width $\delta 2$ of a human subject 2 from the captured picture.

Alternatively or additionally, in some examples and as illustrated in FIG. 2A, the measurement device 4 may further comprise a weighing scale 44 configured to measure a weight $\delta 3$ associated with the body 2. It should be understood that the weight $\delta 3$ may be associated with the maximum width $\lambda$ of the body 2, and may be used to control the radiation dose provided to the body 2 by the radiation provider 3.

In some examples, additionally or alternatively, the weight measurement $\delta 3$ may be used to calibrate the drive requirements for the conveyance apparatus 9.

Alternatively or additionally, in some examples, the determined height $\delta 1$ (expressed in meters) and the determined weight $\delta 3$ (expressed in kg) may be used to determine the body mass index (BMI) $\delta 4$ of the body 2, e.g. by using:

$$\delta 4 = \frac{\delta 3}{\delta 1^2}.$$

It should be understood that the BMI $\delta 4$ may be associated with the maximum width $\lambda$ of the body 2 and may be used to control the radiation dose provided to the body 2 by the radiation provider 3.

Figure 6A:
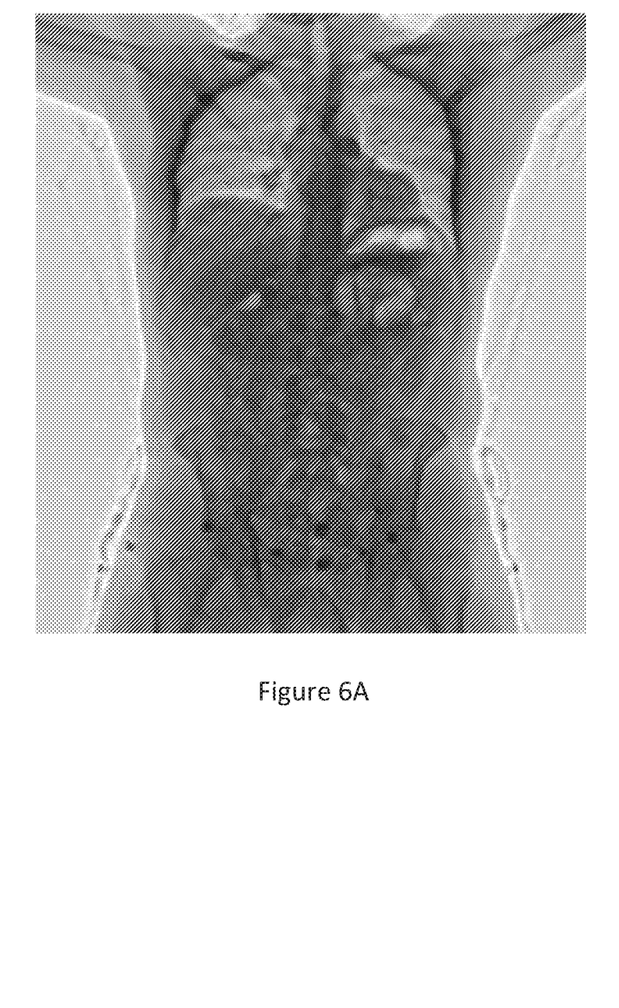
FIG. 6A shows an example image associated with a person whose body mass index is in a normal range (e.g. from 18.5 to 24.9), with a given radiation dose.
Figure 6B:
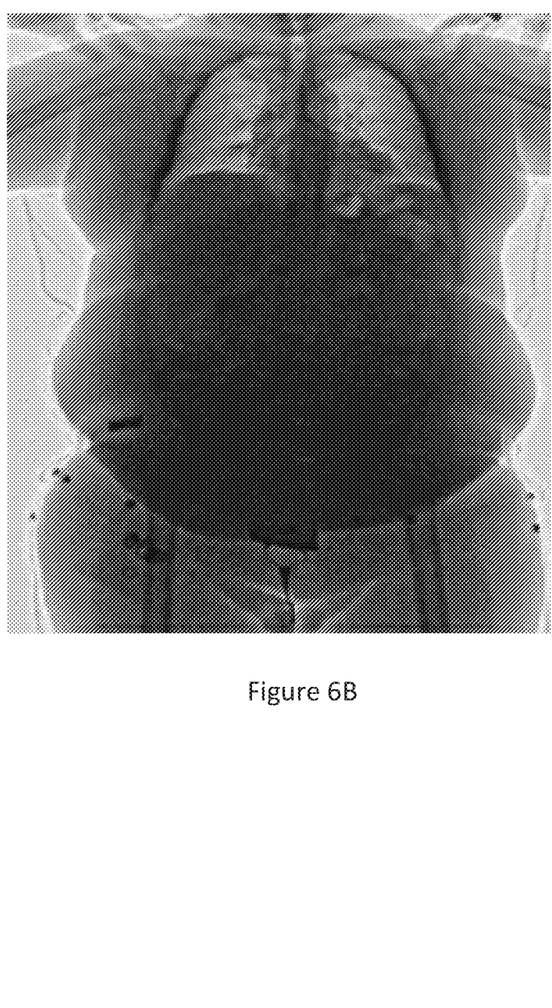
FIG. 6B shows an example image associated with a person whose body mass index is elevated (e.g. of 30 or higher), with the same given radiation dose as in FIG. 6A.

FIGS. 6A and 6B illustrate the effect of the property $\delta$ on the image result. FIG. 6A shows the image detail associated with a person whose BMI $\delta 4$ is in the normal range (e.g. from 18.5 to 24.9), whereas FIG. 6B shows the corresponding image of a person of elevated BMI $\delta 4$ (e.g. of 30 or higher). In both cases of FIGS. 6A and 6B the dose provided is identical. It can be seen that the effect of elevated BMI $\delta 4$ results in a reduction of detail and increased difficulty to detect concealed contraband. Adjusting the dose according to the BMI $\delta 4$ can result in a normalisation of the image characteristic so that the effect of elevated BMI $\delta 4$ is minimised.

Figure 3:
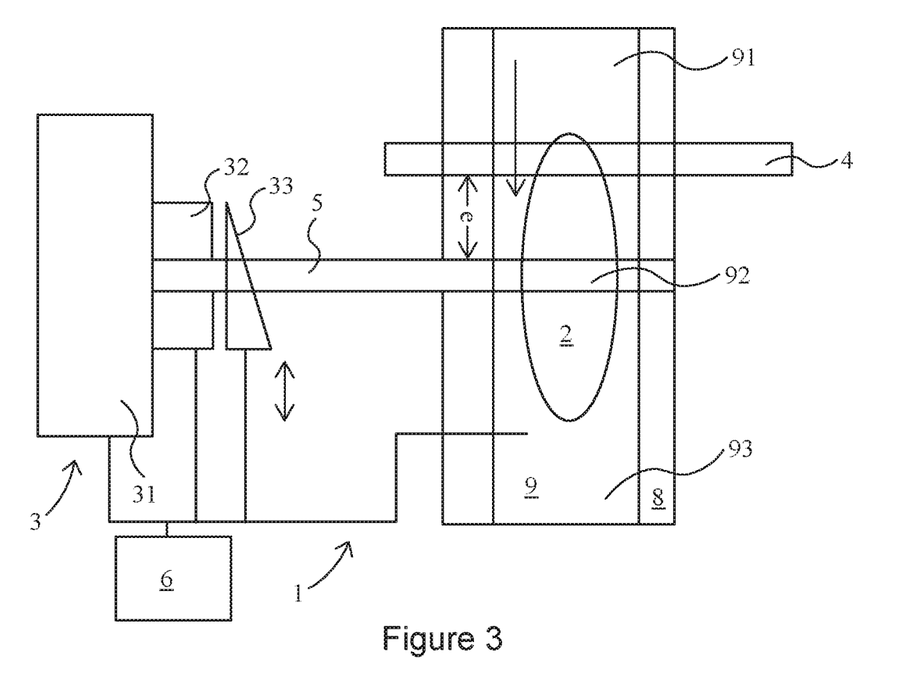
FIG. 3 shows an example radiation provider, viewed from the top.

As illustrated in FIG. 3, a plane of illumination defined by the ionizing radiation 5 and a plane defined by the measurement device 4 (such as e.g. defined by the curtain and/or the range finders and/or the scanner described above) may be offset (e.g. spaced apart by a distance e) in a direction that is transverse to both planes. The measurement device 4 may thereby be arranged so that it does not obstruct the line of sight of the provider 3. It should be understood that the plane of illumination defined by the ionizing radiation 5 and the plane defined by the measurement device 4 may not be spatially offset, but the measurement device 4 may be operated before the provider 3 is operated. In the above examples, the determination of the property $\delta$ (and thus the optimal dose) may thus be performed before exposure of the human or animal body to the ionizing radiation 5, and the body may thus only be exposed to the optimal dose.

In some examples, as illustrated in FIG. 3, the radiation provider 3 comprises a ionizing radiation generator 31. In some examples, the controller 6 may be configured to control the generator 31 based on the at least one property $\delta$ determined by the measurement device 4. In some examples, the generator 31 may be configured to be activated by a power supply associated with an energy output.

It should be understood that the energy output of the power supply may be associated with the radiation dose provided by the ionizing radiation 5 to the body 2.

In some examples, the controller 6 may be configured to control the power supply of the generator 31 to control the radiation dose provided by the generator 31. In some examples, the controller 6 may be configured to control a current and/or a voltage provided to the generator 31. The current and/or the voltage may be increased to increase the radiation dose, and the current and/or the voltage may be decreased to decrease the radiation dose.

Alternatively or additionally, in some examples, as illustrated in FIG. 3, the radiation provider 3 comprises a collimator 32 configured to collimate the ionizing radiation 5 into an inspection beam configured to irradiate a section of the body 2. The collimator 32 may be configured to shape the emitted ionizing radiation into a narrow fan shaped beam.

It should be understood that the width of the inspection beam in the direction of the section for irradiation of the body may be associated with the radiation dose provided by the ionizing radiation 5 to the body 2.

In some examples, the controller 6 may be configured to control the collimator 32 to cause the inspection beam to be controlled based on the at least one property determined by the measurement device 4. The width of the collimator 32 may be increased to increase the radiation dose, and the width of the collimator 32 may be decreased to decrease the radiation dose.

Alternatively or additionally, in some examples, as illustrated in FIG. 3, the radiation provider 3 comprises a filter 33 configured to interact with the ionizing radiation 5. As described in greater detail below, the filter 33 may be configured to interact with the inspection radiation by intersecting the radiation 5 or by not intersecting the inspection radiation 5.

It should be understood that the thickness and/or material of the filter 33 placed in the ionizing radiation beam may be associated with the radiation dose provided by the ionizing radiation 5 to the body 2, as the filter 33 may be configured to attenuate the radiation dose depending on the thickness and/or material of the filter 33 intersecting the beam.

In some examples, the controller 6 may be configured to control the filter 33 to cause the filter to interact with the ionizing radiation 5, based on the at least one property determined by the measurement device. FIG. 3 shows an example where the filter 33 interacts with the radiation beam to provide an inspection dose, for inspection by irradiation of the body 2. In some examples, the controller 6 may control the position of the filter 33 with respect to the radiation beam to control the radiation dose provided to the body 2. The filter 33 illustrated in FIG. 33 has a plurality of different attenuating material thicknesses (e.g. comprised between 1 mm and 20 mm as non-limiting examples). The filter 33 illustrated in FIG. 3 may be configured to control the radiation dose progressively as the position of the filter 33 is modified. It should be understood that other shapes, such as stepped shapes, of filters may be envisaged. Alternatively or additionally, the filter 33 may comprise a plurality of different attenuating materials. Examples of attenuating materials include glass, oil, epoxy, and titanium, aluminum, polyethylene, and stainless steel materials.

The attenuation by the filter 33 may be decreased to increase the radiation dose, and the attenuation by the filter 33 may be increased to decrease the radiation dose.

As illustrated in FIGS. 2A, 2B and 3, the system 1 further comprises the conveyance apparatus 9 configured to impart relative motion between the body 2 and the radiation provider 3, for the scan of the body 2. The conveyance apparatus 9 can include belts and/or rollers for supporting the body 2 to be scanned as it is conveyed through the scanning volume. The conveyance apparatus 9 can further include one or more motors to drive the belts and/or rollers. As illustrated in FIG. 3, the belts and/or the rollers can operate intermittently or continuously to convey or provide the body 2 from an entry area 91, through a scanning area 92, and to an exit area 93. It is contemplated that other forms of conveyance apparatuses can be used.

It should be understood that the speed imparted by the conveyance apparatus 9 may be associated with the radiation dose provided by the ionizing radiation 5 to the body 2.

In some examples, the controller 6 may be configured to control the conveyance apparatus 9 to cause the radiation dose provided to the body 2 by the radiation provider 3 to be controlled based on the at least one property determined by the measurement device. In some examples, the conveyance apparatus 9 can be configured to vary the direction, speed, and acceleration of the motor and associated belt in accordance with control instructions received from the controller 6. For example, the speed imparted by the conveyance apparatus 9 may be decreased to increase the radiation dose, and the speed imparted by the conveyance apparatus 9 may be increased to decrease the radiation dose.

Figure 4:
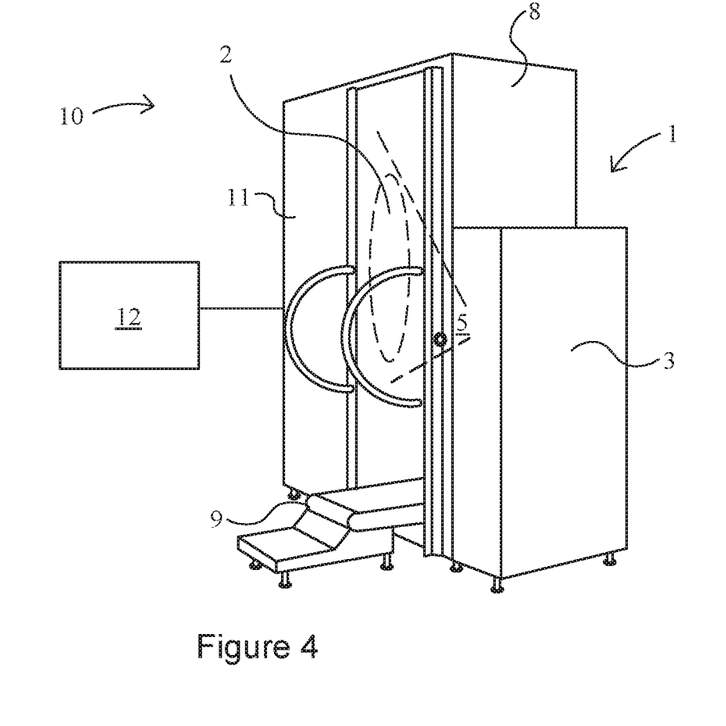
FIG. 4 shows an example apparatus configured to scan a body, in a perspective view.

As illustrated in FIG. 4, an apparatus 10 configured to scan the body 2 to detect any material or object of interest that may be obscured from view or otherwise concealed may comprise the system 1 described above.

The object of interest can include, for example, contraband items, weapons, incendiaries, illicit drugs, radioactive materials, or explosives, such as, but not limited to an improvised explosive device, liquid explosive material, plastic explosives, and the like.

The apparatus 10 can be employed at a security check point at a detention center for screening inmates. Alternatively or additionally, the apparatus 10 can be used at an airport or other transportation terminal where it can be necessary to detect objects of interest or materials concealed on bodies.

The apparatus 10 can include a radiation scanner 11 and a data processor 12 coupled to the radiation scanner 11.

The radiation scanner 11 may include a sensing apparatus for sensing the ionizing radiation from the system 1. In some examples, the radiation scanner 11 may comprise an imager such as a transmission X-ray imager.

The data processor 12 may be configured to obtain an image of the body 2 from data obtained by the radiation scanner 11.

FIG. 5 is a flowchart that illustrates an example method, e.g. for irradiating the body 2. In some examples the method may comprise:
  determining, at S1, at least one property associated with a dimension of a body to inspect, using other than a ionizing radiation; and
  causing, at S2, a radiation dose provided to the body by ionizing radiation to be controlled based on the determined at least one property.

In some examples, the property may be the property δ described above and/or the ionizing radiation may be the ionizing radiation 5 described above.

It should be understood that the method of FIG. 5 may be performed, at least partly, by the system 1 and/or the apparatus 10 described above.

Modifications and Variations

The provider 3 can be configured to provide e.g. X-ray beams over a continuous range of energies, or configured to generate e.g. X-ray beams at a single energy.

The inspection system 1 can include multiple sources or a single source to generate the ionizing radiation 5.

The generator 31 may comprise a linear accelerator or microwave excited X-ray source. The energy of the tissue penetrating radiation may be in the range of 50 keV to 300 kV, such as a 160 kV. For example, to provide an energy range of 50 keV to 160 keV, a tube based X-ray generator may be used, such as in the B-SCAN 16HR-LD range of transmission X-ray scanners or the B-SCAN 16HR-DV range of transmission X-ray scanners, which are available from Smiths Group plc., 459 Park Avenue, Bushey, Watford, Hertfordshire, WD23 2BW, United Kingdom.

In some embodiments the provider 3 may comprise a dual band X-ray source.

In some embodiments the provider 3 comprises a passive source of tissue penetrating radiation such as a radioactive isotope that provides a gamma ray source. The source may also comprise a neutron source.

The dose of the ionizing radiation can range, for example, from 0 to 4.5 µSv, such as from 0 to 2.0 µSV, and ideally less than 0.1 µSv.

The apparatus 10 can be configured to sense the ionizing radiation reflected back or deflected off of the body 2, i.e., backscatter x-ray radiation.

The apparatus 10 can also, actively or passively, examine the body for radioactive material, gamma radiation, or neutron detection. For example, the apparatus 10 can detect radioactive material concealed under the clothing of the body being scanned.

A suitable wave length range of the non-ionising radiation 7 may be from 10 GHz to 500 THz, for example between 15 GHz and 450 GHz, for example between 20 GHz and 400 THz, for example mm-wave radiation from 18 to 27 GHz, and also 77 GHz, also 96 GHz and higher, for example the J/K bands. Infrared radiation in the frequency range of 300 GHz to 430 THz may also be used.

It has been explained above that the imagers may remain stationary and the body 2 may be moved past the sensors. Alternatively or additionally, the conveyance apparatus 9 may be configured such that the body 2 may stand still while it is scanned—either electronic scanning or mechanical scanning may be used. As will be appreciated in the context of the present disclosure, electronic scanning may comprise controlling a phased array to electronically steer a beam of the ionizing radiation.

In some examples the filter 33 may comprise an actuator controlled by the controller 6 (e.g. by translation and/or rotation). In some examples the actuator may comprise any type of actuator, such as comprising an electrical motor and/or a solenoid and/or hydraulic actuators (such as hydraulic cylinders).

The data processor 12 can be coupled to the scanner 11 by, for example, one or more data transmission lines. Data can be wirelessly transferred to the data processor 12 to enable, for example a remote screening application or a cloud networked application.

The data processor 12 can include a processor, memory, a storage device, an input/output interface, e.g. including a display device. The data processor 12 can include additional, fewer, and/or different components than those listed above. The type and number of listed components are exemplary only and not intended to be limiting.

The processor can be a central processing unit(s) (CPU) and/or a graphic processing unit(s) (GPU). The processor can execute sequences of computer program instructions to perform various computation and analysis processes. The memory modules include, among other things, a random access memory (RAM) and a read-only memory (ROM). The computer program instructions can be accessed and read from the ROM, or any other suitable memory location, and loaded into the RAM for execution by the processor. Depending on the type of the data processor being used, the processor can include one or more printed circuit boards, and/or microprocessor chips, or may have the form of a multiprocessor industrial computer or a combination of several independent rack computers optimized for different processing tasks such as image analysis, detection algorithm processing, and image presentation.

The storage device can include any type of mass storage device suitable for storing information. For example, the storage device can include one or more hard disk devices, optical disk devices, or any other storage devices that provide data storage space.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments.

Other embodiments will be apparent to those skilled in the art. It is intended that the specification and examples be considered as exemplary only. The present scope of the disclosure is defined by the appended claims.

The invention claimed is:

1. A system for detecting concealed objects alongside or within a human or animal body, the system comprising:
   a walk-through support structure having an entry area, a scanning area, and an exit area for inspection of an upright human or animal subject, the walk-through support structure including:
      a radiation source configured to provide ionizing radiation to the human or animal body along a first direction, the ionizing radiation giving a radiation dose to the human or animal body, for inspection of the human or animal body to detect hidden objects concealed by the human or animal body's clothing or within the human or animal body;

a measurement device configured to determine a first property associated with a dimension of the human or animal body oriented along the first direction by measuring a parameter, other than the ionizing radiation, that is transmitted and received along the first direction as the human or animal body enters the walk-through support structure and before the radiation source provides ionizing radiation to the human or animal body; and a controller configured to cause the radiation dose provided to the body by the radiation source to be controlled based at least on the first property previously determined by the measurement device.

2. The system of claim 1, wherein the measurement device is configured to measure the parameter including at least one of:

non-ionizing radiation, including one of visible light, laser light, infrared light, terahertz, millimeter waves, and radio-waves; and high frequency acoustic signals, including ultrasounds.

3. The system of claim 2, wherein the measurement device comprises at least one of:

one or more pairs of non-ionizing radiation transmitters and receivers;

at least one range finder;

at least one scanner adapted for scanning soft tissue surfaces of the body; and at least one camera.

4. The system of claim 1, wherein the measurement device is further configured to determine at least a second property associated with the body, wherein the measurement device comprises a weighing scale configured to measure the second property including a weight associated with the body, and wherein the controller is further to cause the radiation dose provided to the body by the radiation source to be controlled based on the second property determined by the measurement device.

5. The system of claim 1, wherein the radiation source comprises an ionizing radiation generator, and wherein the controller is configured to control the generator based on the first property determined by the measurement device.

6. The system of claim 5, wherein the generator is configured to be activated by a power supply associated with an energy output, and wherein the controller is configured to control the power supply of the generator.

7. The system of claim 5, wherein the controller is configured to control at least one of a current and a voltage provided to the generator.

8. The system of claim 1, wherein the radiation source comprises a collimator configured to collimate the ionizing radiation into an inspection beam configured to irradiate a section of the body, and wherein the controller is configured to control the collimator to cause the inspection beam to be controlled based on the first property determined by the measurement device.

9. The system of claim 1, wherein the radiation source comprises a filter configured to attenuate at least a portion of the ionizing radiation, and wherein the controller is configured to control the filter to cause the filter to attenuate the portion of the radiation, based on the first property determined by the measurement device.

10. The system of claim 1, wherein the system further comprises a conveyance apparatus configured to impart relative motion between the body and the radiation source, and wherein the controller is configured to control the conveyance apparatus to cause the radiation dose provided to the body by the radiation source to be controlled based on the first property determined by the measurement device.

11. The system of claim 1, wherein the dimension of the body to inspect is associated with a torso of the human or animal body.

12. The system of claim 1, wherein the first property associated with the dimension of the body to inspect comprises a width of the body, and wherein the measurement device is further configured to determine at least a second property associated with the body, the second property including at least one of:

a height of the body;

a weight of the body; and a body mass index of the body.

13. The system of claim 1, wherein the radiation source is arranged to provide the ionizing radiation to a torso of the body.

14. The system of claim 1, wherein the radiation source comprises a transmission X-ray imager.

15. A method comprising:

receiving a human or animal body into a walk-through support structure for detecting concealed objects alongside or within the human or animal body;

determining at least one property associated with a dimension of the human or animal body to inspect upon entry to the walk-through support structure, the dimension oriented along a first direction, the at least one property determined by measuring a parameter, other than ionizing radiation, that is transmitted and received along the first direction and causing a radiation dose to be provided to the body by ionizing radiation transmitted in the first direction, the ionizing radiation controlled based on the at least one property previously determined.

16. The method of claim 15, performed by a system comprising:

a measurement device configured to perform said determining;

a controller configured to perform said causing; and a radiation source configured to provide the ionizing radiation having the radiation dose to the body in the first direction, for inspection of the body.

17. The system of claim 16, wherein the radiation source comprises an ionizing radiation generator, and wherein the controller is configured to control at least one of a current and a voltage provided to the generator.

18. A system for detecting concealed objects alongside or within a human or animal body, the system comprising:

a walk-through support structure having an entry area, a scanning area, and an exit area for inspection of an upright human or animal subject, the walk-through support structure including:

a radiation source configured to provide ionizing radiation to the human or animal body along a first direction, the ionizing radiation having a radiation dose, for inspection of the body to detect hidden objects concealed by the human or animal body's clothing or within the human or animal body;

a measurement device configured to determine a first property associated with a dimension of the body oriented along a second direction orthogonal to the first direction, the measurement device configured to determine the first property by measuring a parameter, other than the ionizing radiation, that is transmitted and received along the second direction as the human or animal body enters the walk-through support structure and before the radiation source provides ionizing radiation to the human or animal body;
a controller configured to cause the radiation dose provided to the body by the radiation source to be controlled based at least on the first property previously determined by the measurement device.

\* \* \* \* \*